UNITED STATES PATENT OFFICE.

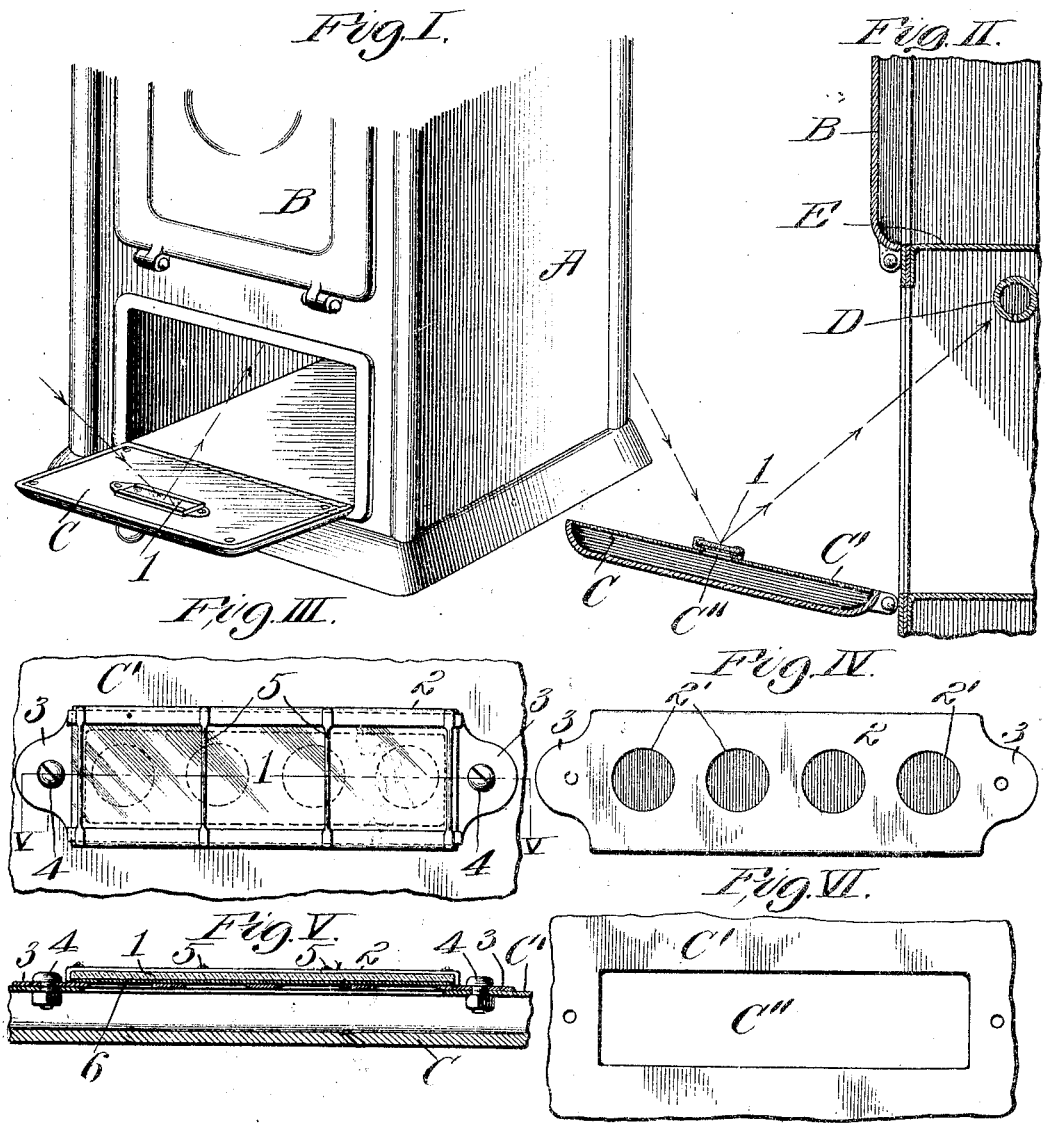

BENJAMIN F. ALLEN AND GEORGE R. FORD, OF ST. LOUIS, MISSOURI; SAID ALLEN ASSIGNOR TO SAID FORD.

MIRROR ATTACHMENT FOR GAS-STOVE DOORS.

No. 821,346.   Specification of Letters Patent.   Patented May 29, 1906.

Application filed May 22, 1905. Serial No. 261,660.

*To all whom it may concern:*

Be it known that we, BENJAMIN F. ALLEN and GEORGE R. FORD, citizens of the United States, residing in the city of St. Louis, in the State of Missouri, have invented certain new and useful Improvements in Mirror Attachments for Gas-Stove Doors, of which the following is a full, clear, and exact description, reference being had to the accompanying drawings, forming part of this specification.

Our invention relates to a mirror attachment for application to the lower door of a gas-stove oven, through the medium of which the burner beneath the oven-floor may be observed for the purpose of ascertaining whether the gas escaping from said burner is ignited or not. By this means we avoid the necessity of a person having to stoop down and look into the lower oven for the purpose of ascertaining whether the burner is lighted.

Figure I is a perspective view of the lower portion of a gas-stove with the lower oven-door in open position and our mirror attachment applied thereto. Fig. II is a vertical section taken through the forward part of the lower portion of a gas-stove with the lower oven-door in open position. Fig. III is an enlarged top view of a fragment of the lower oven-door with our mirror attachment applied thereto. Fig. IV is an enlarged rear view of the mirror-frame. Fig. V is a longitudinal section taken on line V V, Fig. III. Fig. VI is an enlarged view of a portion of the lining of the oven-door to which the mirror attachment is applied at the location of application of the mirror attachment.

A designates a portion of a gas-stove, B and C, respectively, the upper and lower oven-doors, and D a part of the burner beneath the floor E of the upper oven.

1 designates a mirror which may be of any desirable size and configuration and which is applied to the lower oven-door C at its inner side in such position that the rays of light from the jets of flame of the burner D will be cast thereupon when the lower oven-door is open. By so locating the mirror a person viewing it when the lower oven-door is open may readily discern whether or not the gas escaping from the oven-burner is ignited.

The mirror 1 is preferably positioned within a frame 2, that has overturned lips at its sides by which the mirror is held, as seen most clearly in Fig. III. The frame 2 has ears 3 at its ends that are provided with perforations, through which bolts 4 are passed and introduced through the lining C' of the lower oven-door to hold the frame to said lining. Extending transversely across the face of the frame 2 and the mirror therein are guard-rods 5, that serve to prevent breakage of the mirror by any object being struck thereagainst when being placed within or removed from the lower oven of the stove. At the rear of the mirror within the frame 2 is a protective sheet 6, preferably of asbestos. In the rear side of the frame 2 are a plurality of air-holes 2'. In the oven-door lining C' immediately back of the mirror is an aperture C'', that provides for the air between the outer wall of the door C and the door-lining entering into the back of the mirror-frame through the air-holes therein. By this means the heat imparted to the mirror is permitted to be radiated therefrom into the air-space between the lining and outer wall of the oven-door C, thereby preventing breakage of the mirror.

We claim as our invention—

1. The combination with a gas-stove oven-door, of a mirror-frame provided with air-holes at the rear side thereof, and a mirror seated in said frame, substantially as set forth.

2. The combination with a gas-stove oven-door having an apertured lining, of a mirror-frame secured to said door at the location of the aperture in said lining and provided with air-holes, and a mirror seated in said frame, substantially as set forth.

3. The combination with a gas-stove oven-door having a lining provided with an aperture, of a mirror-frame secured to said door and having a plurality of air-holes registering with the aperture in the lining, a mirror seated in said frame, and a protective sheet at the rear of said mirror, substantially as set forth.

BENJAMIN F. ALLEN.
GEORGE R. FORD.

In presence of—
NELLIE V. ALEXANDER,
E. S. KNIGHT.